March 15, 1927.                                                           1,621,296
F. B. WALDRON
PROCESS OF GRINDING AND POLISHING GLASS AND APPARATUS THEREFOR
Filed Nov. 11, 1924
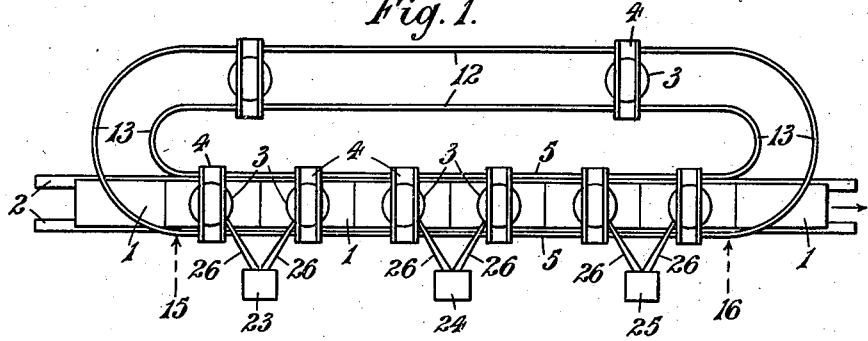
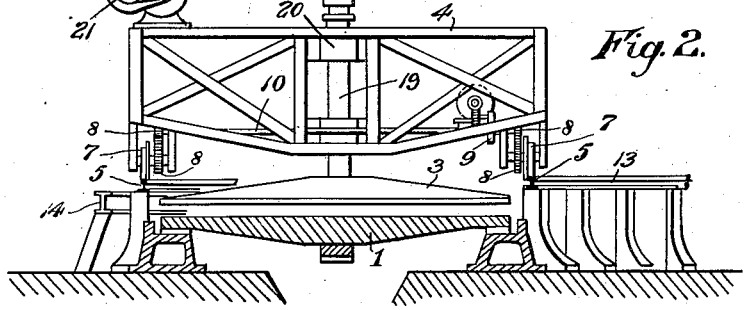
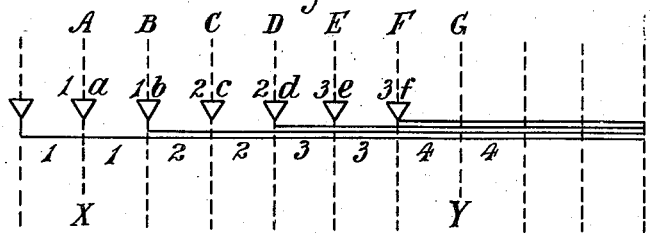
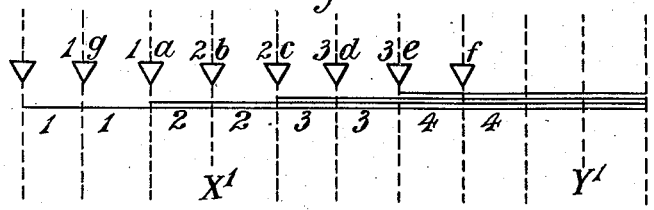
Inventor.
F. B. Waldron
By Rogers, Kennedy Campbell
Attys.

Patented Mar. 15, 1927.

1,621,296

UNITED STATES PATENT OFFICE.

FREDERIC BARNES WALDRON, OF PRESCOT, ENGLAND, ASSIGNOR TO PILKINGTON BROTHERS LIMITED, OF LIVERPOOL, ENGLAND, A BRITISH COMPANY.

PROCESS OF GRINDING AND POLISHING GLASS AND APPARATUS THEREFOR.

Application filed November 11, 1924, Serial No. 749,136, and in Great Britain November 23, 1923.

This invention relates to continuous grinding and polishing of a series of plates of glass and apparatus therefor, and has for its object improved methods and apparatus whereby the grinding and polishing are done in a shorter time and with less expenditure of power, than has heretofore obtained with other methods.

In the following specification and claims, the term "continuous grinding and polishing" as applied to methods or apparatus is used to mean the grinding and polishing of a strip of glass or a series of plates of glass forming a practically continuous strip which is moved in the direction of its length, and is subjected to the action of grinding and polishing runners during its motion.

The term "runner" when not specifically characterized is used to mean either a grinding or a polishing runner of any known type adapted to the work, whether rotary or reciprocating or both. The term "stationary" when applied to a runner is used to mean stationary in respect to travel only. The operation of "smoothing" sometimes applied to the later stages of grinding, is taken to be included in the operation of grinding. The term "abrasive treatment" is to be taken to include the whole of the polishing of glass, whether or not the action of the rouge customarily used is abrasive.

In the continuous grinding and polishing apparatus as heretofore employed, the strip of glass is passed slowly under a series of stationary runners. Each runner therefore is always performing the same work with the same abrasive or polishing medium on glass which is in the same stage of the polishing operation.

This process is found to have the disadvantage set out below.

When a strip of glass is passed under a number of grinding runners, it is found that the surface produced by the operation of a runner, though commercially flat, is not accurately flat, and that one runner tends to give the glass a surface having generally a different contour to that given by another runner. When therefore the glass passes from one runner to the next, this latter has not merely to continue the operation performed by the previous runner, or, if operating with a finer abrasive, to make the surface smoother, but has first to change the contour of the surface. This change of contour is of no commercial value and the work and time expended on it are wasted. Moreover, when the change has to be effected by a runner operating with a finer abrasive than that used with a previous runner, the work and time so wasted may be very great.

In the case of polishing runners, the above considerations respecting change of contour, do not apply to an appreciable extent, but each runner has to pass through a series of stages in which the treatment and consequently the condition of its polishing surfaces, differ. Customarily there are three such stages, one in which the rouge is washed out of the surfaces by a plentiful supply of water, a second in which rouge and water are supplied to the polishing surfaces, and a third in which water only is supplied while the rouge impregnating the surface effects the polishing, sufficient water only being supplied as a lubricant. To effect good and rapid polishing, each runner must pass successively through these three stages and each section of glass must be operated on successively by polishing runners having their surfaces in the condition of these three stages.

According to this invention, the runners as well as the strip of glass are caused to travel either continuously or intermittently. In the case of grinding runners, the change of contour is avoided wholly or partially by diminishing the length of glass strip on which each runner operates, while each runner operates in succession with every grade of abrasive to which it is adapted. In the case of polishing runners, the polishing media supplied are varied so that the condition of the operative surface of each runner and, consequently, its action on the glass, varies with and is adapted to the conditions of the glass on which it is operating.

In the accompanying drawings:—

Figure 1 is a diagrammatic plan view (partly broken away) of a continuous grinding and polishing apparatus according to the present invention;

Figure 2 is a transverse section of the glass-carrying tables on their guides, showing a runner frame in elevation and Figures 3 and 4 are diagrams indicating a polishing operation.

The series of glass-carrying tables 1 are moved on their guides 2 in the direction of the arrow in Figure 1, in the customary manner, the means for removing tables from, and adding them to, the series, not being shown. Runners 3 mounted in frames 4 are adapted to travel along the line of the tables 1, on rails 5. Each runner frame 4 may be caused to travel by any convenient means, such as a motor 6 driving the frame-supporting wheels 7 through gears 8, differential gear in a case 9, on shaft 10, and worm wheel 11.

Each runner frame 4 is caused to travel from the position shown at 15 in Figure 1, to the position 16 and is then removed to a return track 12, by means of which it is brought back to its initial position over the tables. The frame 4 may be transferred from the operative track 5 to the return track 12 by any convenient means such as that shown, in which the track 5 is connected at each end to the track 12 by curved tracks 13, the outer rails being supported in their passage over the tables, on girders 14 (Figure 2).

Each runner is mounted on a vertical shaft 19 adapted to be turned in bearings 20 through a belt and gear drive 21 by a motor 22 mounted on a frame 4. Any other form of runner may, however, be employed, such as a plurality of rotating discs mounted on a frame, or reciprocating blocks.

It is to be understood that a plurality of runners 3 operate simultaneously on the length of glass and they may be so close together that practically the whole surface of the glass along the length is operated on simultaneously, or they may be close together in sets, with intervals between the sets for washing. For the purpose of the following description however, it is assumed that runners such as are shown in the drawings are employed, each runner being separated from the next by a certain space.

Apparatus for the supply of media for the abrasive treatment are located at intervals along the apparatus, as at 23, 24, 25 and the media are supplied to the runners 3 by conduits 26. Each apparatus supplies the same medium to runners during a certain period in their operative course. For instance, apparatus 23 may supply water in considerable quantity to the runners during the first period in their course, apparatus 24 rouge and water to the runners during the second period in their course and apparatus 25 water in small quantity during the final period.

According to one form of the invention, and referring to the action of any one runner, the runner is kept stationary and operates (if a grinding runner, with a given grade of abrasive, and if a polishing runner, with a given treatment), that is to say, with the supply of a certain medium from one of the apparatus 23, 24 or 25, until a certain length of glass has passed under it. It is then travelled rapidly to the foremost end of the portion of strip on which it has operated, and again kept stationary, so that the same portion of strip again passes under it, while the runner operates on it again with a finer grade of abrasive or with the next successive treatment that is to say, with the supply of a medium different in composition or volume from the next successive supply apparatus.

According to a second form of the invention, each runner is travelled with the strip of glass but at a greater speed, until it has operated on a certain length of strip and then it remains stationary, until the same length of strip has passed under it, when it is again travelled at a greater speed and so on.

In both the above described forms, the runner may be given the same grade of abrasive or the same treatment during two or more successive operations on the portion of strip, before the grade of abrasive or treatment is changed, and in this way, by suitably choosing the length of strip operated on, the amount of grinding effected with one abrasive may be made to differ from that effected with another, and similarly, the amount of polishing effected with one treatment may be made to differ from that effected with another.

It will be seen that, in both the above described forms of the invention, the whole length of glass in operative position is divided up into lengths, each of which is operated on by one runner (or group of runners) only until the whole grinding or polishing operation is completed.

In a third form of the invention which is of advantage only in the case of polishing runners, the runners all travel at a constant speed, which, for the purpose of this description will be assumed to be half the speed of the glass. Further, it will be assumed that each runner is to be subjected to three different kinds of treatment, denoted by treatments 1, 2 and 3 and that, while subjected to these treatments, it is to start operating on the glass in three different stages of the process, denoted by stages 1, 2 and 3 respectively, the stage after completion of the third being denoted by 4.

Referring to Figures 3 and 4, X, Y (Figure 3) represents a length of glass which, in a given time, travels to $X^1$, $Y^1$ (Figure 4). On the length X, Y are six runners, $a$, $b$, $c$, $d$, $e$ and $f$, at equal distances apart, namely half the distance moved by the length X, Y in travelling to $X^1$, $Y^1$. These runners are shown in Figure 3 as occupying positions relative to the ground indicated by A, B, C, D, E, F, respectively. In the given time, each runner moves into the position previously occupied by the preceding runner, that is to say into positions B, C, D and so on. If, in Figure 3, the several divisions of the length of glass be in the stages of the process indicated by the Figures 1, 2, 3 connected therewith, and further indicated by the superimposed horizontal lines, and if the several runners are to be subjected to the treatments denoted by the Figures 1, 2, 3 connected therewith, the result of the operation of the runners on the length X, Y, in its travel to $X^1$, $Y^1$, is as indicated by the Figures 1, 2, 3 connected with the divisions of the length of glass and with the runners in Figure 4. The runner $f$, having reached position G and completed its operation with treatment 3 is removed from the operative track, while a runner $g$ comes into position. It will be seen that each runner operates successively with treatments 1, 2 and 3 during its operation on each pair of divisions in which the glass is in stages 1, 2 and 3 respectively.

In the above description, three treatments and a ratio of speeds of glass and runners of 2 to 1, have been taken only by way of example, and any desired number of treatments may be given and any ratio of speeds, integral or fractional and any number of runners may operate simultaneously with the same treatment. It is, however, to be observed that with certain ratios of speeds and numbers of runners, the point at which the final operation is completed, varies in position, but may be made to retain a fixed average position.

Two or more forms of the invention may be employed in a single grinding and polishing apparatus, thus the first or second described form may be employed in the grinding section, while the third described form, which is especially applicable to polishing runners, may be employed in the polishing section, or the invention may be employed only in the grinding or only in the polishing section or in only a portion of a section of the apparatus.

It is to be understood that the term "media" is herein used to include water, sand, emery, rouge or any abrasive, burnishing agent or lubricant.

Having described my invention, I declare that what I claim and desire to secure by Letters Patent is:—

1. In the continuous process of the abrasive treatment of glass involving the travelling of the glass, travelling a plurality of runners in the same direction as the glass and varying the supply of media for said treatment by each runner at successive stages of travel of that runner so as to produce an action of each runner of the plurality varying with and adapted to the condition of the glass on which it is operating.

2. In the continuous process of the abrasive treatment of glass involving the travelling of the glass, travelling a plurality of runners in the same direction as the glass and varying the supply of media for said treatment by each runner at successive stages of travel of that runner so as to produce an action of each runner of the plurality varying with and adapted to the conditions of the glass on which it is operating and, when each runner has completed its operative course, removing it from the line of travel of the glass and restoring it at the beginning of its operative course.

3. In the continuous process of the abrasive treatment of glass involving the travelling of the glass, travelling a plurality of runners intermittently in the same direction as the glass and varying the supply of media for said treatment by each runner at successive stages of travel of that runner so as to produce an action of each runner of the plurality varying with and adapted to the condition of the glass on which it is operating.

4. In the continuous process of the abrasive treatment of glass involving the travelling of the glass, travelling a plurality of runners intermittently in the same direction as the glass and varying the supply of media for said treatment by each runner at successive stages of travel of that runner so as to produce an action of each runner of the plurality varying with and adapted to the condition of the glass on which it is operating and, when each runner has completed its operative course, removing it from the line of travel of the glass and restoring it at the beginning of its operative course.

5. In the continuous process of the abrasive treatment of glass involving the travelling of the glass, travelling a plurality of runners intermittently in the same direction as the glass, causing them to operate on the glass during their intermittencies of travel and varying the supply of media for said treatment by each runner at successive stages of travel of that runner so as to produce an action of each runner of the plurality varying with and adapted to the condition of the glass on which it is operating.

6. In the continuous process of the abrasive treatment of glass involving the travelling of the glass, travelling a plurality of runners intermittently in the same direction as the glass, causing them to operate on the glass during their intermittencies of travel and varying the supply of media for said treatment by each runner at successive stages of travel of that runner so as to produce an action of each runner of the plurality varying with and adapted to the condition of the glass on which it is operating and, when each runner has completed its operative course, removing it from the line of travel of the glass and restoring it at the beginning of its operative course.

7. In the continuous process of the abrasive treatment of glass involving the travelling of the glass, travelling a plurality of runners intermittently in the same direction as the glass, causing them to operate continuously on the glass during their operative courses and varying the supply of media for said treatment by each runner at successive stages of travel of that runner so as to produce an action of each runner of the plurality varying with and adapted to the condition of the glass on which it is operating.

8. In the continuous process of the abrasive treatment of glass involving the travelling of the glass, travelling a plurality of runners intermittently, in the same direction as the glass, causing them to operate continuously on the glass during their operative courses and varying the supply of media for said treatment by each runner at successive stages of travel of that runner so as to produce an action of each runner of the plurality varying with and adapted to the condition of the glass on which it is operating and, when each runner has completed its operative course removing it from the line of travel of the glass and restoring it at the beginning of its operative course.

9. In the continuous process of the abrasive treatment of glass involving the travelling of the glass, travelling the polishing runners in the same direction as the glass, supplying water to a runner operating on the glass in the final stage of travel, and supplying rouge and water to said runner operating on the glass in an earlier stage of its travel.

10. In the continuous process of the abrasive treatment of glass involving the travelling of the glass, travelling the polishing runners in the same direction as the glass, supplying water to a runner operating on the glass in the final stage of travel, supplying rouge and water to said runner operating on the glass in an earlier stage of its travel and, when each runner has completed its operative course, removing it from the line of travel of the glass and restoring it at the beginning of its operative course.

11. In apparatus for the continuous abrasive treatment of glass, means adapted to move a plurality of runners in the same direction as the glass, and a plurality of means adapted to give different supplies of media for the said treatment by each runner at successive stages of travel of that runner, each of the said means being arranged to give the same supply to each runner during a certain period in its operative course.

12. In apparatus for the continuous abrasive treatment of glass, means adapted to move a plurality of runners in the same direction as the glass, a plurality of means adapted to give different supplies of media for the said treatment, by each runner at successive stages of travel of that runner, each of the said means being arranged to give the same supply to each runner during a certain period in its operative course, and means adapted to remove each of the said runners from the line of travel of the glass and to restore it at the beginning of its operative course.

13. In apparatus for the continuous abrasive treatment of glass, means adapted to move the polishing runners in the same direction as the glass, means adapted to supply rouge and water to each runner during a certain period of its operative course, and means adapted to supply water to the said runner during a subsequent period.

14. In apparatus for the continuous abrasive treatment of glass, means adapted to move the polishing runners in the same direction as the glass, means adapted to supply rouge and water to each runner during a certain period of its operative course, means adapted to supply water to said runner during a subsequent period, and means adapted to remove each of the said runners from the line of travel of the glass and to restore it at the beginning of its operative course.

In testimony whereof I have affixed my signature hereto.

FREDERIC BARNES WALDRON.